Oct. 25, 1932.   R. BERINGER ET AL   1,883,869
OVERGEAR TRANSMISSION
Filed Dec. 27, 1926

Inventors
Ernest W. Seaholm
Roscoe Beringer

By Blackmore, Spencer & Flint
Attorneys

Patented Oct. 25, 1932

1,883,869

UNITED STATES PATENT OFFICE

ROSCOE BERINGER AND ERNEST W. SEAHOLM, OF DETROIT, MICHIGAN, ASSIGNORS TO GENERAL MOTORS CORPORATION, OF DETROIT, MICHIGAN, A CORPORATION OF DELAWARE

OVERGEAR TRANSMISSION

Application filed December 27, 1926. Serial No. 157,193.

This invention relates to gearing and is more particularly concerned with an improvement in vehicle power transmission.

Among the objects of the invention are to afford added flexibility, to permit the use of a more advantageous ratio between the driving pinion and the ring gear at the rear axle, to secure a quiet transmission not only when running in high but also in third speed and in second speed. The invention also makes use of a comparatively short countershaft and a reduced distance between the centres of the aligned shafts and the countershaft.

For the attainment of the above and other objects the structure below has been designed.

Accompanying the following description is a drawing illustrating a single embodiment of the invention.

Figures 1, 2, 3:
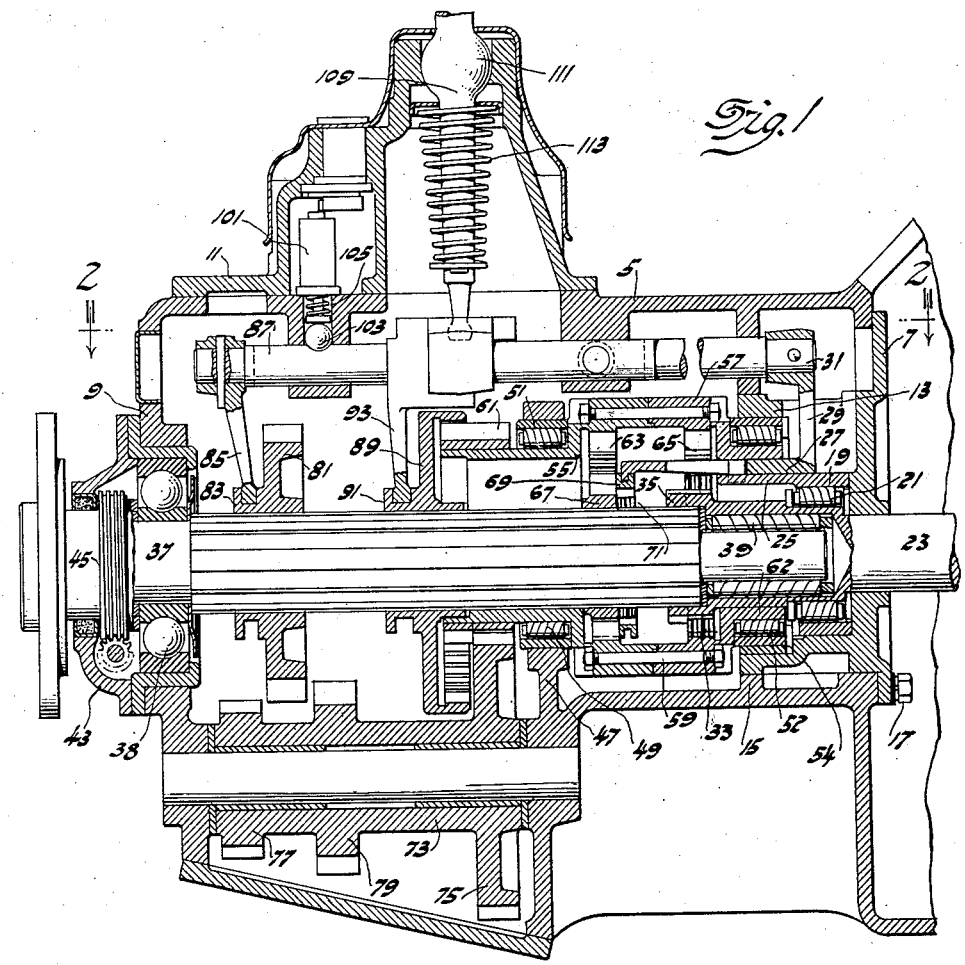
Figure 1 is a longitudinal vertical section of my improved transmission.
Figure 2 is a horizontal section on the line 2—2 of Figure 1.
Figure 3 is an end elevation of parts within the transmission housing.

Referring by reference characters to the several figures of the drawing, the transmission housing is designated by numeral 5. It is provided with end walls 7 and 9 and a cover member 11. End wall 7 extends inwardly as at 13 and engages an inner circular projection 15 of the casing and is held in position by fastening means 17. Within the extension 13 is an outer race 19 for bearings 21, the latter providing an anti-friction mounting for shaft 23, this shaft being the clutch driven shaft. Inwardly of bearing 21 the race 19 is formed as a shelf or wall 25 of arc shape, this wall serving as a guide for a correspondingly shaped part 27 of a fork 29 carried by rod 31. Clutch shaft 23 is enlarged at its inner end where it is formed with radial teeth constituting an external gear 33, and with axial teeth to constitute a clutch element 35.

Shaft 37 is the driving shaft, or spline shaft. It is reduced at its forward end where it is piloted within the enlarged end of shaft 23 bearings 39 being used as shown. This spline shaft, at its rear end, is mounted within anti-friction bearings, as at 38 in the rear housing wall 9. Outside the bearings 38 there may be a supplemental cover 43 housing a gear 45 for driving a speedometer drive shaft, not shown.

The gear housing has an intermediate partition 47 having an opening eccentric with reference to the aligned shafts 23 and 37. Within this opening is a bearing 49 having an outer race 51. Concentric with reference to the bearing 49 the extension 13 of end wall 7 has a bearing 52 and an outer race 54. Journalled in bearings 49 and 52 is a gear cage or ring formed by securing together two members 55 and 57 by means of bolts 59. Cage member 55 has an annular wall forming the inner race for bearing 49 and beyond the bearing has gear teeth forming an external gear 61. Cage member 57 has an annular wall 62 within bearing 52. Cage member 55 has an internal gear 63 and cage member 57 has an internal gear 65. Slidable on the spline shaft within the cage is a clutch gear member 67 having a collar 69 engaged by the portion 27 of fork 29 as shown. The clutch gear member is in the form of a spur gear with axial clutch teeth 71.

Beneath the aligned shafts is a countershaft 73 journalled in the casing. This shaft has a spur gear 75 engaging external gear 61, and it also is provided with spur gears 77 and 79. An idler gear, not shown, is mounted in the casing and is in constant driving engagement with gear 77.

On the spline shaft is a gear 81 having a collar 83 engaged by a fork 85 extending from a sliding rod 87. This gear is, when in neutral, positioned out of engagement with gear 79 and also out of engagement with the idler but it may be selectively moved to engage either of said gears. Also slidable on the spline shaft is a gear 89 having a collar 91 engaged by fork 93 carried by a third sliding rod 95. Gear 89 has internal teeth to engage, when in operative position, the end portion of gear 61 of the eccentrically mounted cage.

A lock of suitable type is shown at 101. It consists of a ball 103 which when unlocked may move against the tension of the spring 105.

A conventional interlock for use with the three sliding rods is shown in Figure 2. It will be seen that balls 105 are positioned in openings in the partitions between the middle rod and each outer rod. Also the middle rod is apertured for a pin 107 movable transversely by either of the balls when use is made of one of the outermost rods in shifting.

The operating lever is designated by numeral 109. It has a ball joint at 111 within the cover, a spring 113 holding the ball in position. At its lower end lever 109 moves transversely to engage any one of the three rods, the outermost rods being notched at 115 and the intermediate rod having a transverse slot 117 through which the lever end may pass. From its neutral position active positions of the lever are obtained by longitudinal movements as will be understood. For locating the lever in second speed position as it is being moved transversely there may be employed a spring 119 carried by the housing, the spring 119 having a right angular end shaped to yieldingly engage the lower end of the lever when said lever is in its mid position transversely. This is illustrated in Figure 3.

The operation of the transmission may be briefly described. The gear cage or ring is constantly driven by gears 33 and 65. The sliding clutch gear may be moved to directly clutch the driving shaft 23 with the driven shaft 37, teeth 71 engaging teeth 35. To obtain a drive through the cage, clutch gear member 67 is moved to the left to affect a driving engagement between its radial teeth and internal gear 63 of the cage. The drive is then through the first gear train including gears 33 and 65 and the second gear train including gears 63 and 67 of which gear 67, being keyed to the spline shaft, completes the drive from 23 to 37. The number of teeth in the two gear sets may be as desired so that the spline shaft may be driven through external-internal gear trains at a speed above that of the driving shaft or at a speed below that of the driving shaft. In the former case the third speed will obviously be the direct drive, and in the latter case the highest speed will be the direct drive. The lever 109 effects this driving engagement by fore and aft movement of rod 31.

To drive in low or in reverse the operator shifts laterally lever 109 to a position where it engages rod 87. Fore and aft movements then bring gear 81 into engagement with gear 79 for low speed or into engagement with the reverse idler driven by gear 77 for driving in reverse.

For driving in second the transverse movement of the lever is stopped where spring 119 gives warning to the operator that the lever 109 is in a position to move rod 95. A longitudinal movement of rod 95 moves gear 89 into engagement with gear 61. The driven cage member then drives the spline shaft through the quiet external-internal gearing, including gears 61 and 89 to drive the spline shaft in second speed.

One most important advantage obtained by this transmission is an added quiet drive ratio. The drive in second speed and also the drive in third speed and fourth speed are quiet drives. Two of these drive ratios employ external-internal gearing and the third is a direct clutch engagement. Since these drive ratios, second, third and fourth speeds are the ones ordinarily used, (low speed and reverse only being occasionally made use of), the car is substantially always being driven by a quiet transmission.

Since the countershaft is driven by the cage which is itself driven at a speed less than that of the driving shaft the reduction between the countershaft and the spline shaft may be less than that usually employed and therefore the line of centres between these shafts may be reduced. This aids in reducing the depth of the transmission housing as a whole. The drive of the countershaft from the gear cage as shown instead of from a gear on the driving shaft just within the transmission housing makes possible a considerable shortening of the length of the countershaft. This makes possible a reduction in the overall length of the countershaft portion of the transmission housing, and reduces the weight of the parts in constant driving connection with shaft 23. This is of value in that it reduces the momentum of the rotating parts when the clutch is disconnected in the act of shifting gears.

We claim:

1. In a transmission for vehicles, aligned driving and driven shafts, means to clutch said shafts for a direct drive, means to additionally drive said driven shaft at a plurality of speeds relative to said driving shaft and in the same direction of rotation, each speed ratio being effected through a plurality of external internal gear trains, the gears of each of said gear trains being rotatable about fixed axes eccentric to each other, one gear train being common to each of said plurality of said external internal gear trains.

2. In a transmission for vehicles, telescopically arranged shafts, means to directly clutch said shafts, means to additionally drive said driven shaft from said driving shaft at a plurality of speeds and in the same direction, the gearing for each speed ratio comprising two external-internal gear trains each including a common gear member eccentrically surrounding said shafts.

3. In a transmission for vehicles, aligned driving and driven shafts, an eccentrically positioned gear ring surrounding said shafts, constantly meshed gears on said driving shaft and eccentric ring, a plurality of independently operable external-internal gear trains between the eccentric ring and the driven shaft, whereby said gear trains may rotate the driven shaft at two different speed ratios with reference to the driving shaft both in the same direction, and means to selectably operate said gear trains.

4. The invention defined by claim 3, said external-internal gear trains each including a member slidable on the driven shaft for making and breaking the drive between the eccentric ring and the driven shaft.

5. The invention defined in claim 3, said external-internal gear trains each including a member slidable on the driven shaft, one of said slidable members including a part to directly clutch said driving shaft and driven shaft.

6. A transmission for vehicles, comprising driving and driven shafts, an eccentrically positioned ring around said shafts, gearing between said driving shaft and said ring, an external gear on said ring, an internal gear on said driven shaft slidable into engagement with said external ring gear, a countershaft, a gear thereon in constant engagement with said external ring gear and additional gearing between the countershaft and the driven shaft.

7. A transmission for vehicles, comprising driving and driven shafts, an eccentrically positioned ring around said shafts, gearing between said driving shaft and said ring, an external gear on said ring, an internal gear on said driven shaft slidable into engagement with said external ring gear, an internal gear on said ring, an external clutch gear slidable on said shaft to engage said internal gear or to clutch said driven shaft to said driving shaft.

In testimony whereof we affix our signatures.

ROSCOE BERINGER.
E. W. SEAHOLM.